United States Patent [19]

Shepherd et al.

[11] Patent Number: 5,256,222
[45] Date of Patent: Oct. 26, 1993

[54] LIGHTWEIGHT BUILDING MATERIAL BOARD

[75] Inventors: Philip B. Shepherd, Sedalia; Rick L. Dolin, Littleton, both of Colo.

[73] Assignee: Manville Corporation, Denver, Colo.

[21] Appl. No.: 744,543

[22] Filed: Aug. 13, 1991

Related U.S. Application Data

[63] Continuation-in-part of Ser. No. 579,754, Sep. 10, 1990, abandoned.

[51] Int. Cl.$^5$ .................. B32B 31/06; C04B 14/18
[52] U.S. Cl. ........................ 156/41; 156/45; 156/346; 106/631; 106/698
[58] Field of Search ............ 156/39, 41, 43, 44, 156/45, 42, 346, 347; 106/602, 605, 612, 631, 685, 688, 698, 800, DIG. 2

[56] References Cited

U.S. PATENT DOCUMENTS

| | | | |
|---|---|---|---|
| 1,655,718 | 1/1928 | Weiss | 156/43 |
| 1,808,571 | 6/1931 | Raynes | 156/42 |
| 1,867,797 | 7/1932 | Armstrong | 156/39 |
| 1,908,658 | 5/1933 | Dean | 156/347 |
| 2,705,198 | 3/1955 | Seybold | 92/3 |
| 2,717,841 | 9/1955 | Brefeld et al. | 106/688 |
| 3,516,882 | 6/1970 | Cummisford | 156/39 |
| 3,565,650 | 2/1971 | Cordon et al. | 106/97 |
| 3,809,566 | 5/1974 | Revord | 106/110 |
| 3,819,388 | 6/1974 | Cornwell | 106/86 |
| 3,886,076 | 5/1975 | Venable | 106/DIG. 2 |
| 3,957,501 | 5/1976 | Matsuda et al. | 106/605 |
| 3,988,199 | 10/1976 | Hillmer et al. | 162/101 |
| 4,042,406 | 8/1977 | Gray | 106/88 |
| 4,126,512 | 11/1978 | Hill | 162/171 |
| 4,263,408 | 4/1981 | Hacker | 106/84 |
| 4,297,311 | 10/1981 | Sherman et al. | 264/109 |
| 4,336,068 | 6/1982 | Vogel et al. | 106/DIG. 2 |
| 4,664,712 | 5/1987 | Cisneros | 106/602 |
| 4,695,494 | 9/1987 | Fowler et al. | 264/109 |

FOREIGN PATENT DOCUMENTS

| | | |
|---|---|---|
| 301432 | 12/1967 | Austria . |
| 0176649 | 4/1984 | European Pat. Off. . |
| 0310138 | 10/1988 | European Pat. Off. . |
| 1463895 | 9/1965 | France . |
| 2342147 | 9/1977 | France . |
| 70329 | 6/1979 | Japan ............. 106/698 |
| 575896 | 3/1946 | United Kingdom ........ 156/43 |
| 1188140 | 4/1970 | United Kingdom ........ 106/688 |

OTHER PUBLICATIONS

Chemical Abstract, vol. 97, No. 22, 29 Nov. 1982, Columbus, Ohio, US; abstract No. 187266J, G. Andrejko: Regulation of the curing of expanded perlite forms of silicon dioxide and/or aluminum oxide binder, p. 316.
Chemical Abstract, vol. 88, No. 12, 20 Mar. 1978, Columbus, Ohio, US; abstract No. 78112Z, S. Suzuki et al; Inorganic binder with improved waterproofness, p. 255.
Chemical Abstract, vol. 89, No. 6, 7 Aug. 1978, Columbus, Ohio, US; abstract No. 48107E, T. Tabata: Lightweight inorganic panels, p. 266.

*Primary Examiner*—Michael W. Ball
*Assistant Examiner*—Steven D. Maki
*Attorney, Agent, or Firm*—Cornelius P. Quinn

[57] ABSTRACT

A lightweight wallboard having a density in the range of 10 pcf to 30 pcf and comprised of a faced layer of expanded siliceous inorganic particles, such as expanded perlite, bonded together by inorganic binder, such as sodium silicate. The board is made by depositing a mixture of particles, binder and water onto a moving web of facing material, contacting the mixture with an upper moving web of facing material, compacting the mixture to the desired shape and density and drying the resulting board. Fire resistant and water repellent versions of the formula are also disclosed.

15 Claims, 2 Drawing Sheets

LIGHTWEIGHT BUILDING MATERIAL BOARD

CROSS REFERENCE TO RELATED APPLICATION

This application is a continuation-in-part of application Ser. No. 579,754 filed Sep. 10, 1990 now abandoned.

FIELD OF THE INVENTION

This invention relates to a building material board and to a method of manufacturing the same. More particularly, it relates to the manufacture of a lightweight high strength wallboard.

BACKGROUND OF THE INVENTION

Wallboard is a generic term used in the building industry to define structure materials capable of being attached to wall or ceiling support structure and capable of receiving a decorative finish or design. Gypsum based wallboard products have heretofore been the standard of the industry, having gained acceptance due to their low cost and their generally adequate performance in the field. Because gypsum products are relatively dense, being in the range of 38 pcf to 45 pcf, they can be quite heavy, particularly in thicker widths of board. This makes it difficult to handle and install, and, because gypsum wallboard is heavy in relation to its strength, it has a tendency to break under its own weight when being handled. In fact, building materials dealers have reported up to 25% loss of the board due to damage incurred during handling.

Gypsum wallboard includes a family of interior wall and ceiling claddings comprising a core of hydrated gypsum rock and paper facers. The paper facers normally are made on cylinder machines from recycled paper in order to produce a porous paper capable of receiving the gypsum crystals that grow from the wet core slurry prior to drying. It is not practical to significantly decrease the density of the gypsum core in order to make a lighter weight product because with a core density below about 40 pcf, a good bond between the facer and core may not be obtained even when using optimum grade paper.

Obviously, it would be advantageous to have available a lightweight wallboard of sufficiently high strength to enable it to replace conventional gypsum wallboard. Such a product would provide a number of advantages over gypsum board. Because it would not be as heavy as gypsum board, but would nonetheless possess good strength, wallboard breakage would be greatly reduced. The lighter weight product would also decrease shipping costs and allow it to be carried by a single worker instead of two. One person could also install the board and could be counted on to work more efficiently for longer periods as a result of less job-caused fatigue. The likelihood of damage to predecorated wallboard would also be reduced because lighter weight wallboard would be easier to handle and therefore less likely to be brought into damaging contact with another surface.

The idea of binding a lightweight aggregate in order to make a board product is not new, and has in fact been suggested in the prior art. None of these suggestions, however, has resulted in a successful commercial product.

U.S. Pat. No. 3,819,388 to Cornwell discloses gypsum and portland cement based cementitious compositions which incorporate lightweight mineral aggregate such as vermiculite. The density of the product is controlled by the addition of a bubble forming additive which produces a cellular structure intended to provide for heat and sound insulation. The material is intended to be sprayed over steel structures or cast or pumped into wall structures. It was not designed to be formed into a board or panel to be used as a substitute for gypsum wallboard.

U.S. Pat. No. 4,042,406 to Gray discloses a building material for use in interior partitions of buildings. The material contains expanded perlite aggregate and portland cement, and is intended for use as a concrete block. The product has a higher density than desired, typically being about 41 pcf, the same as gypsum wallboard, and moreover is not designed for use as a wallboard.

U.S Pat. No. 4,263,048 to Hacker discloses a self-hardening cementitious composition, which may contain expanded aggregate as an extender, for use as an insulator against extremes of temperature. The composition is comprised of a combination of inorganic binders and related materials in order to make the product self-hardening. Expanded perlite up to 11.5 pcf in density can be incorporated in the mix. There is no suggestion in this patent of a simple, inexpensive lightweight high strength wallboard which can compete in terms of price and strength with gypsum board. Further, as will be brought out in more detail later, the present invention cannot employ expanded perlite of such high density.

U S. Patent No. 2,705,198 to Seybold discloses a wallboard containing fibrous material, mineral filler such as perlite, and a binder composition. Since the wallboard contains substantial amounts of fibrous material, a dilute slurry is employed in order to process the ingredients. The core mixture must therefore be dewatered before being compacted and dried to a board product. No densities or strength figures are given in the disclosure. Such a process cannot be used in connection with the present invention.

U.S. Pat. No. 4,126,512 to Hill discloses a lightweight roof insulating board comprising cellulosic fibers, expanded perlite particles and a binder comprised of asphalt and starch. The board product is designed to be used under a roof membrane, not as a wallboard, and is formed from an aqueous slurry comprising about 95% water, thereby requiring an expensive drying process to rid the wet composition of excess water.

U.S. Pat. No. 3,988,199 to Hillmer et al relates to the same general type of roof insulation board as discussed in the preceding paragraph, but includes gypsum as an additional essential ingredient. This is for the purpose of increasing the green strength of the composition during manufacture of the board so that the distance between the rollers which convey the wet board to the dryer can be maximized.

U.S. Pat. No. 4,695,494 to Fowler, Jr. et al discloses a fire door core material comprising a major amount of expanded perlite, adhesive material including starch, and glass fibers. The process of manufacture is a batch process which requires the dry ingredients, including the starch adhesive, to be mixed before adding water so that the ingredients and adhesive are ensured of being uniformly mixed prior to activating the adhesive. Further, the perlite particles are required to be in the density range of 4.5 pcf to 7.5 pcf in order to obtain the desired strength. As will be explained hereinafter, the present invention utilizes expanded perlite of a lower density range which surprisingly is required in order to reach the desired level of strength. The fire door core composition of Fowler, Jr. et al is not designed to be laminated to facer sheets in order to function as a wallboard.

U.S. Pat. No. 4,297,311 to Sherman et al discloses a mineral board product which comprises predominantly perlite with a resin binder. Fibrous additives may also be utilized if desired. The board is produced by a process which requires less water than the usual aqueous slurry type of forming process. In order to provide the desired level of strength the perlite is required to be crushed prior to the setting of the resin binder, which also reduces the bulk volume of the perlite. The perlite density may range from low to relatively high.

Although the above discussion illustrates the variety of products and processes known in the prior art, none of the prior art teachings is directed to a lightweight wallboard which is sufficiently strong and economical to be used in place of gypsum wallboard.

BRIEF SUMMARY OF THE INVENTION

The present invention provides a lightweight board product which is substantially lighter than gypsum board but which is otherwise capable of performing similarly to gypsum board once installed. Moreover, the board of the invention is economical to produce, making it competitive with gypsum board in all respects.

The board is produced by forming a mixture of expanded siliceous inorganic particles, inorganic binder, water and, if necessary, a setting agent for the binder. The particles have a density in the range of 1.5 to 4 pcf and are of a size in the range of 100 to 1000 microns. For a standard board product, and also for a water repellent board, the inorganic particles are present in the mixture in the range of 40% to 60% the inorganic binder is present in the range of 5% to 20% the water in the range of 10% to 60% and the setting agent in the range of 0% to 10%, all amounts being by weight of the final mixture. For a fire resistant board, the particles are present in the mixture in the range of 35% to 50% the inorganic binder, which is a heat absorbing material, in the range of 15% to 30% and the water in the range of 15% to 60%. The mixture is shaped into a layer and pressure is applied in the range of 30 psi to 500 psi to compact the expanded inorganic particles. During the compacting operation a substantial number of particles are broken by the pressure, leaving, however, a substantial number of particles which remain intact. The compacted layer is heated to drive off water, and facing sheets are applied to the opposite major faces of the layer. The degree of compaction and heating is such that the dry density of the compacted layer is in the range of 10 pcf to 30 pcf.

Preferably, the process is continuous, whereby the facing sheets are applied to the mixture prior to the compacting operation in the form of moving webs, and pressure is applied to the mixture by press rolls which engage the webs. The expanded siliceous inorganic particles preferably are comprised of expanded perlite particles, while the inorganic binder preferably is comprised of sodium silicate for the standard and water repellent boards and of magnesium oxychloride or magnesium oxysulfate for the fire resistant board.

The above and other aspects of the invention, as well as other benefits, will readily be ascertained from the more detailed description of the preferred embodiment which follows.

DETAILED DESCRIPTION OF THE PREFERRED EMBODIMENTS

Figure 1:
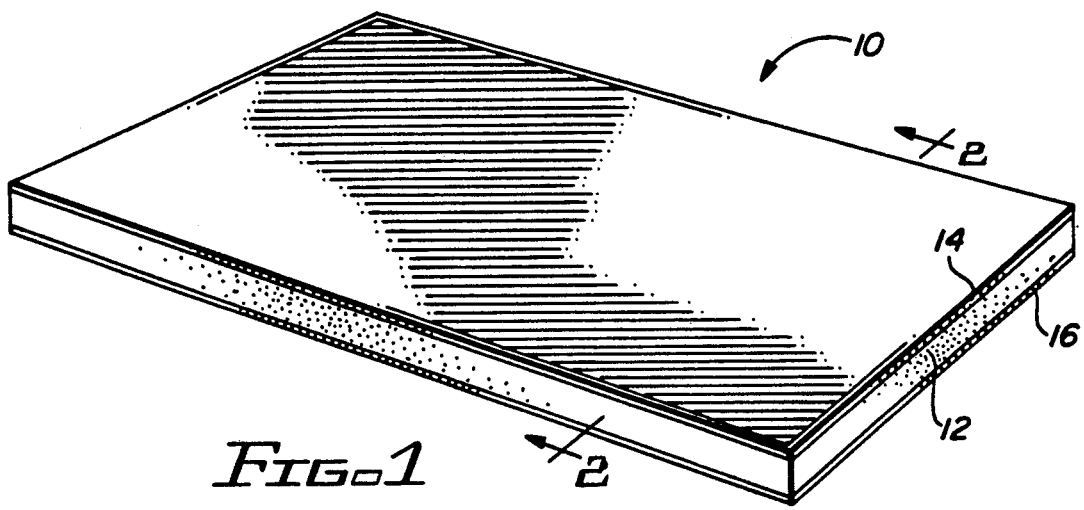
FIG. 1 is a partial pictorial view of a wallboard made in accordance with the invention.
Figure 2:
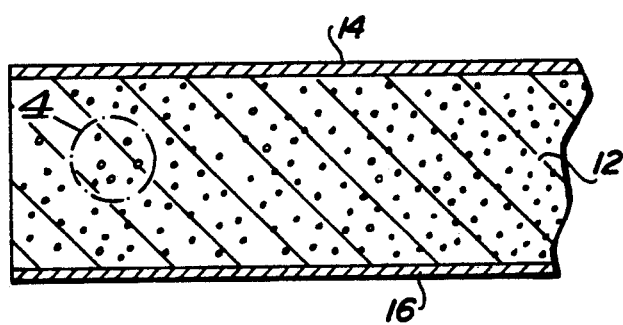
FIG. 2 is an enlarged partial transverse sectional view taken on line 2—2 of FIG. 1.

A wallboard 10 made in accordance with the present invention is illustrated in FIGS. 1 and 2 as comprising a core 12 faced with upper and lower facing sheets 14 and 16. The core has been formed from a mixture containing the ingredients listed in Table I at the indicated weight percentage levels, based upon the total weight of the mixture.

TABLE 1

| Ingredient | Ingredients, wt. % General | Preferred |
|---|---|---|
| Expanded siliceous inorganic aggregate | 40–65 | 50–60 |
| Inorganic binder (dry weight) | 5–20 | 7–15 |
| Water | 10–60 | 20–30 |
| Setting agent | 0–10 | 0–3 |

The expanded siliceous inorganic aggregate utilized in the invention has a density in the range of 1.5 pcf to 4 pcf, and preferably is in the range of 1.5 pcf to 3 pcf. The density of the aggregate has to do with the ultimate strength of the core material, the relationship being such that the lower the density the greater the strength, as will be explained in more detail later. The preferred material is expanded perlite, although other types of expanded particulate materials could also be used.

The particle size of the aggregate, which is determined by the average diameter of the particles, will generally be in the range of 100 to 1000 microns and preferably in the range of 400 to 600 microns. The broad range reflects the size of particle best suited to provide the desired density range. Particle sizes less than 100 microns or greater than 1000 microns are difficult to obtain because the raw unexpanded ore which is the source of the expanded particles cannot readily be expanded to particles which are smaller or larger than these limits in the desired density range.

The binder should be inorganic for purposes of fire resistance, should be capable of providing adequate bonding strength, should not cause environmental problems and should be economical. In addition, to lend itself to use in the process of the invention, the inorganic binder should be soluble in water. Monovalent silicates, which include but are not limited to sodium silicate and potassium silicate, have been found to best satisfy these criteria, with sodium silicate being most preferred from the point of view of cost/performance considerations. The ratio of silica to sodium oxide should preferably be in the range of about 2.5–4:1, with a ratio of 3.22:1 being most preferred.

Typically, the monovalent silicate will be added to the reaction mixture in the form of a water solution. Preferably, the solution should have a solids content in the range of about 34-44% by weight, most preferably about 37 wt %. One example of a suitable commercially available sodium silicate solution is the N grade marketed by PQ Corporation of Valley Forge, Pa.

Inorganic binders such as colloidal silica and colloidal alumina may also be considered for use but are not preferred inasmuch as they are not film-forming binders in the manner of soluble silicates.

It may be necessary to employ a suitable setting agent for the inorganic binder in order to provide moisture resistance in the sense of preventing loss of strength due to the presence of moisture. As described hereinafter, it is also possible to provide for water repellency by the addition of a further ingredient. The term "setting agent" as used herein means any substance which will react with the binder to form an insoluble complex. One class of setting agents which can be used in the invention comprises divalent or trivalent metal compounds. Examples are magnesium oxide, zinc oxide, calcium carbonate, magnesium carbonate, zinc sulfate, zinc stearate and aluminum chloride.

Another type of setting agent which can be used is carbon dioxide gas, which would be administered by forcing it under pressure through the wallboard after the board has been compressed into shape. Magnesium oxide, however, is the preferred setting agent because of its relatively low cost, its nontoxic character and the fact that the reaction product is not water soluble.

Figure 3:
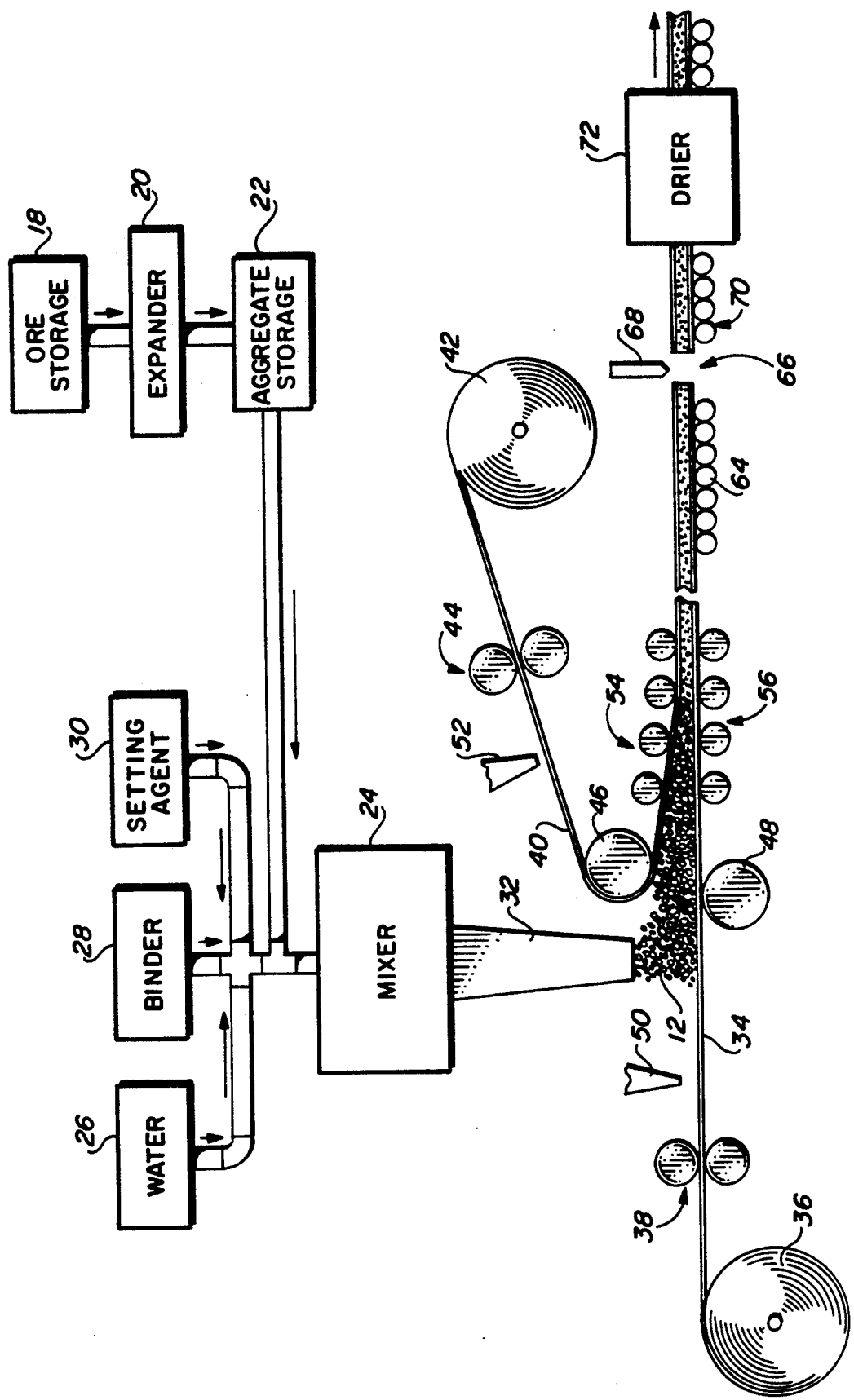
FIG. 3 is a schematic view of the apparatus for producing the board of the invention.

Referring now to FIG. 3, which schematically illustrates the process of making the board of the invention, the inorganic expandable ore, preferably, perlite ore, is first expanded to the size and density ranges discussed above. The ore in this case is fed from a storage container 18 to expander 20, the design and operation of which is well known in the industry. The expanded particles are directed from the expander 20 to a storage tank 22, from which they are fed to a mixer 24. Also introduced to the mixer 24 are the other ingredients of the mixture used to form the core 12 shown in FIG. 1. Thus water from a source 26, binder from a source 28 and the setting agent, when used, from a source 30 are added. The mixer 24 may be of any suitable type, as long as it is capable of thoroughly mixing the various ingredients without destroying the integrity of the expanded perlite particles. Preferably, it would be a low-to-moderate shear horizontal paddle or ribbon type mixer.

The preferred sequence of mixing is to introduce the expanded perlite particles to the mixer, followed by the setting agent, if utilized, which would be mixed until uniformly distributed throughout the perlite before the wet binder ingredients, e.g. the sodium silicate solution and water, are added. The wet ingredients may be added as a spray or a fine liquid stream, and mixing must be sufficiently vigorous to break up any small lumps which might form so as to create a smooth uniform mixture, but not so vigorously that the expanded perlite particles are severely broken. If this happens the problem is simple to recognize because a significant decrease in the volume of the mixture would result.

After being thoroughly mixed, the mixture 12 is deposited from the feed hopper 32 onto a moving web 34 which is drawn from supply roll 36 by pull rolls 38. Slightly downstream from the feed hopper 32 another moving web 40, which is drawn from supply roll 42 by pull rolls 44, is directed by guide and press roll 46 onto the top of the mixture 12. A guide and press roll 48, over which the web 34 travels, is positioned opposite the roll 46. Preferably, glue applicators, shown in the form of nozzles 50 and 52 but which may also take the form of glue applicator rolls, are provided in order to apply adhesive to the inner surfaces of the webs. The use of a separate adhesive layer to bond the web or facing to the core material provides for a good bond at much lower core densities, and also allows the use of a wide variety of facing materials. The requirements of the facing material are discussed in more detail later.

The mixture 12 exits the discharge hopper 32 generally uniformly across the width of the web 34 and is consolidated to an initial thickness by the rolls 46 and 48. As the continuous composite or sandwich formed by the webs and the mixture moves downstream, it passes between press rolls 54 and 56. The press rolls are illustrated as comprising a series of opposing rolls, each set of which can be made to apply incrementally greater pressure than the next upstream set of rolls. Alternatively, a single set of press rolls can be employed if the pressure of the single set of rolls is not so great as to squeeze the mixture back in the upstream direction. In either case the final pressure applied must be sufficient to compact the mixture to the desired density of the mixture.

The final density of the core material may vary within limits. It should not be lower than about 10 pcf because lower densities tend to cause the material to lose its integrity. To provide for ease of handling and economies of shipping and cost, the density should not be greater than about 30 pcf. Further, above this density the final board product is so hard that it is difficult to drive a nail into it without cracking the board. In order to achieve the desired density level while at the same time making the board sufficiently strong, it is necessary to use very low density aggregate. For this reason the aggregate is of the expanded type, which can be formed in the very low density range of 1.5 pcf to 4 pcf discussed above. The low density is necessary because the compression strength of the board is a function of how much material can be compacted. Thus the lower the density of the expanded aggregate, the stronger the resulting product will be at the desired density. This is contrary to the usual expectation that higher density ingredients will produce stronger end products.

Figure 4:
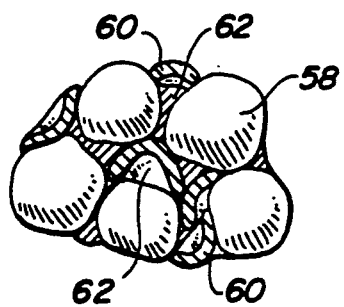
FIG. 4 is an enlarged transverse sectional view of the area of FIG. 2 enclosed by the circle 4.

To achieve the proper degree of compaction in the mixture the final pressures applied should be such that a significant proportion of the expanded particles break as a result of the pressing operation. The particles should not all be crushed, as in U.S. Pat. No. 4,297,311, since it is desirable that a significant proportion remain intact. This results in a desirable blend of intact expanded particles and broken pieces of particles which allows the final density of the core material to be low while possessing good compression strength. This arrangement is depicted in FIG. 4, wherein the compacted mixture 12 includes a number of expanded particles 58 and pieces of broken expanded particles 60, all bound together by the inorganic binder 62. Although some of the broken pieces may be small, a substantial number will comprise large chunks of the expanded particles, such as half a spherical particle or larger.

The breakage of some of the particles during pressing can be demonstrated by dispersing samples of the compressed and uncompressed wet core mix in water. Nearly all of the unpressed material floats, indicating the presence of a substantial amount of unbroken spheres containing trapped air. A significant portion of particles from the compressed mix will float, but about an equal volume will sink, indicating the presence of fractured pieces of the particles which do not hold air. Such fractured pieces, therefore, have a greater density than water.

The amount of pressure necessary to achieve this arrangement will vary depending upon the final desired density, but will be in the range of about 30 psi to about 500 psi. The level of 30 psi represents the pressure needed to produce core material of 10 pcf, while 500 psi represents the maximum amount required to produce core material of 30 pcf. It is noted that a great deal more pressure is required to reach the higher density levels than medium range density levels. For example, to achieve a density in the range of 15 pcf to 20 pcf, the press rolls should exert a pressure in the range of 50 psi to 200 psi. Obviously, it is not possible to give a precise pressure figure for any particular density since it will vary with the formulation and with processing conditions.

When the required roll pressure is too great to be applied by one set of press rolls without squeezing the mixture back in the upstream direction, relatively low initial pressure will be applied by the most upstream set of rolls, followed by increasingly higher pressures applied by subsequent sets of rolls as necessary.

Although not shown, the forming section of the apparatus may be provided with edge guides or other means to hold up the edges of the facing webs to ensure that they will contain the fluffy, uncompacted mixture. The core material mixture may be spread to provide uniform product density and hardness or may be spread to provide a varying density profile. For example, the mixture at the edge portions of the webs may be subjected to greater pressure so as to provide higher density edges on the resulting board. For a product having a facer wrapped around an edge, the folded edges of the bottom web would be supported vertically until they reach the last or most downstream set of press rolls. The board would be pressed to final thickness prior to reaching the last set of rolls, after which adhesive would be applied to the exposed flaps of the bottom facer web. The flaps are then folded over to contact the top facer web and the final press rolls adhere the flaps to the top web. If tapered edges are desired, the press rolls can be contoured to press the taper formation into the board product, as is known in the art.

To enable the mixture 12 to be worked and shaped in the manner discussed, it is essential that it not be too wet. Otherwise, it could simply flow when subjected to pressures from the press rolls and not be compacted to the desired density or compressive strength. For this reason the amount of water in the mixture must not be too great, nor must it be so minimal that the mixture is too dry to be properly worked. It has been determined that the mixture should contain at least 10% moisture and not more than 60% moisture in order to meet these conditions, and that more preferably this range is 20% to 30%. Such amounts result in the mixture having a feel of slightly damp powder prior to compaction.

Referring again to FIG. 3, after the continuous sandwich formed by the webs 34 and 40 and the compacted mixture 12 leaves the press roll section, it is transported downstream by suitable conveyor means, such as live rollers 64. When it reaches the cutting station 66 it is severed across its width by knife 68. The resulting length of board may then be moved downstream by an accelerating section 70 through a drier 72, where the water in the mix is driven out and the binder is set. The temperature to which the materials are subjected in the drier and the duration of travel through the drier will vary according to conditions, including the board thickness, the type and amounts of binder and the drier heat transfer rate. In any case, drying conditions should be uniform to prevent warping of the board due to uneven shrinkage. Additionally, for binders that set on drying, such as sodium silicate, the combination of drying time and temperature level should be sufficient to remove all free water from the mixture. It has been found that the temperature may vary from 150° F. to 400° F., with the range of 200° F. to 250° F. being preferred. Heating should continue for at least 15 minutes but not more than 6 hours, with the preferred times ranging from 30 minutes to one hour.

Although the core material may contain minor amounts of other materials as determined to be necessary in order to provide certain specific properties otherwise unattainable, and although this may include small amounts of various types of fibers, the mixture will not include sufficient amounts of fibers or other additives to make the finished core material strong enough in flexural strength to function independently of facer sheets. For this reason the facers 14 and 16 are provided in the present invention. Various types of facing materials could be used to provide this function. The facers should be capable of being supplied in roll form so as to be used in the manufacturing process in the manner described, and should also be porous to the extent necessary to allow moisture to escape from the core material. They should also be capable of receiving adhesive coatings to permit adherence to the core material. In addition, the facing sheets should be capable of receiving decorative treatment, such as a coating of paint. Obviously, a variety of different types of facer materials will perform adequately within the requirements stated above, and so the invention is not limited to the use of any one or more specific types. Examples which were found to be satisfactory are 60-pound paper made from reclaimed newsprint fibers and 42-pound paper made from kraft fibers. In both cases the reference to pounds refers to the weight of 1000 square feet of the paper.

After drying, the board is ready for use as an interior wallboard. The flexural strength of the core material itself will be at least about 20 pounds as measured by ASTM C-473 on the basis of material ½ inch thick and 4 inches wide with a 3 inch span. The flexural strength of a faced product will generally be at least about 40 pounds in the width direction of the product and 110 pounds in the length direction, measured on samples ½ inch thick and 12 inches wide, with a span of 14 inches.

The following non-limiting examples further illustrate the invention.

EXAMPLE I

The following materials were mixed together for 2½ minutes in a Hobart mixer at slow speed:
- 300 g (42%) expanded perlite, density 2.3 pcf, average diameter 150-200 microns
- 216 g (30%) Type N sodium silicate solution, from PQ Corporation, 37% solids content
- 20 g (3%) MgO
- 184 g (25%) Water The total solids content of the mixture was 56 weight percent.

A sheet of drywall paper painted with a 25% starch adhesive solution was placed in a 13 inch by 13 inch mold, and 400 grams of the mixture were placed on the paper. Another sheet of drywall paper painted with the same starch adhesive solution was placed on top of the mixture, and the resulting sandwich was pressed to ½ inch thickness and dried at about 200° F. to form a first board sample. The procedure was repeated using 800 grams and 1200 grams of the core mixture to produce second and third board samples. Flexural strength (width direction) results of each board sample are given in Table 2. The results are then compared to a standard faced gypsum wallboard product of ½ inch thickness.

TABLE 2

| Board No. | Board (Faced) Compaction Flexural | | Strength, lbs. | |
|---|---|---|---|---|
| | Density, pcf | Pressure, psi | A | B |
| 1 | 13 | 30 | 16 | 55 |
| 2 | 23 | 189 | 23 | 79 |
| 3 | 33 | 355 | 16 | 55 |
| Gypsum Board | 41 | — | 14 | 48 |

Notes
A - measured in accordance with ASTM C-473 on the basis of a sample measuring ½ inch thick by 3 inches wide with a 12 inch span.
B - figures were extrapolated from A on the basis of a 12 inch wide sample with a 14 inch span as specified in ASTM C-473.

The data show that the inventive perlite based wallboard sample numbers 1, 2 and 3 all have a higher flexural strength at lower board densities than the standard gypsum wallboard product. Additionally, no dewatering step was needed to form any of the wallboard samples of the invention.

EXAMPLE II

The ingredients were mixed together in a 10 cubic foot low-shear mixer at 75 rpm for about 7 minutes:
16.2 lbs. (47%) expanded perlite, 2.5 pcf, 400 micron average diameter
9.7 lbs. (28%) Type N sodium silicate solution from PQ Corporation, 37% solids content
0.8 lbs. (2%) MgO
7.8 lbs. (23%) Water The total solids content of the mixture was 60 wt %.

A sheet of drywall paper painted with Type N sodium silicate solution was placed in a 48-inch by 98-inch mold. The prepared core mixture was then poured into the mold and another sheet of drywall paper with sodium silicate adhesive was placed on the surface of the layer of mixture. The sample was then pressed and compacted at a pressure of about 95 psi to ½ inch thickness and dried at 200° F.–250° F. for about 2 hours.

The resulting board had a density of 19 pcf and flexural strength, as measured according to ASTM C-473, in the length direction of about 125 pounds and in the width direction of about 40 pounds.

This example again illustrates that the board of the invention is very lightweight, but yet has surprisingly high flexural strength.

EXAMPLE III

This calculated sample demonstrates the improved handling characteristics which result from the reduced weight of the board of this invention.

The specification (ASTM C-36) for gypsum wallboard requires a minimum lengthwise flexural strength of 110 pounds for a ½ inch thick board. This strength requirement can be met both by gypsum board and by the lightweight wallboard of the present invention. However, due to the relatively high density of gypsum board, a greater proportion of its strength is required to support the weight of the product than in the case of the lightweight board of the present invention. For such a board, more of the strength is available to avoid breakage in handling or to allow handling of greater board lengths.

To illustrate this difference, the length of board which can be supported at the ends before breaking under its own weight was calculated. Formulas familiar to those skilled in structural engineering were used to model the board as a simply supported plate. This would be equivalent to a board being carried horizontally by two people, each holding an end. A minimum lengthwise flexural strength of 110 pounds was assumed for each type of board. A typical density of 41.25 pcf was assumed for the gypsum board and 18.75 pcf for the board of the invention. The length of board which would break under its own weight was calculated to be 12.3 feet for the standard gypsum wallboard versus 18.2 feet for the board of the invention. Therefore, a 12 foot length of gypsum board must be handled very carefully to avoid breakage under its own weight, and it can readily be broken if an additional force is applied, such as by the impact of dropping it. A 12 foot length of the board of the invention, however, would have a significant amount of its strength available to resist breakage under the same conditions. Even a 16 foot length could be carried horizontally without breaking.

It was earlier stated that the binder should be inorganic for purposes of fire resistance. While the invention described thus far meets this requirement and is adequate for standard or conventional applications, some applications require the board to have a fire resistant rating, which involves passing certain fire tests. For example, fire resistance test ASTM E119 gives a time rating for protection provided by a wall against fire in an adjacent room. The fire causes the temperature near the exposed wall face to increase from room temperature to 1000° F. in five minutes, and to 1700° F. in one hour. Failure is defined as when either hot gases or flames penetrate the wall or when the unexposed face of the wall exceeds an average 250° F. temperature rise. When tested, standard ½ inch thick gypsum board failed at about 50 minutes while standard ½ inch expanded perlite board made in accordance with the invention described above failed at about 20 minutes. The gypsum board failed due to excessive temperatures at the unexposed face of the board and, after shrinking and cracking, collapsed shortly after failure. The perlite board maintained its size and integrity long after face temperature failure as a result of the face exposed to the flame fusing to a glassy surface layer, providing continued protection against penetration of flames and hot gases. Thus the basic perlite board of the invention provides good fire protection against penetration of flame and hot gases, but requires modification to pass the described fire test.

In order to provide sufficient fire resistance to prevent test failure, a modified core was developed from a mixture containing the ingredients listed in Table 3 at the indicated weight percentage levels, based upon the total weight of the mixture.

TABLE 3

| Ingredient | Ingredients, wt. % | |
|---|---|---|
| | General | Preferred |
| Expanded siliceous inorganic aggregate | 35–50 | 40–45 |
| Magnesium oxychloride or Magnesium oxysulfate binder (anhydrous basis) | 15–30 | 20–25 |

TABLE 3-continued

| Ingredient | Ingredients, wt. % General | Preferred |
|---|---|---|
| Water | 15-60 | 20-40 |

Note that the range of inorganic particle content is slightly less than in the standard board and that the low end of the range of water content is slightly less. This reflects the somewhat higher content of the specialized fire resistant binder. Both magnesium oxychloride and magnesium oxysulfate are heat-absorbing ingredients which were found to be effective as binders also. In addition to replacing the binder in the nonfire-rated board, these ingredients can be cured to contain up to 50% water of hydration, compared to for gypsum. This means they can absorb about 2½ times the amount of heat per pound as gypsum. A typical formulation utilizing magnesium oxychloride is as follows:

EXAMPLE IV 508 pounds per 1000 square feet (lbs/MSF) (43%) expanded perlite, density 2.3 pcf, average diameter 150-200 microns
138 lbs/MSF (12%) reactive magnesium oxide
106 lbs/MSF (9%) magnesium chloride (anhydrous basis)
423 lbs/MSF (36%) water In preparing the mixture, the magnesium chloride is dissolved in the water, which generates considerable heat. If necessary, the solution is allowed to cool in order to control the reaction rate with the magnesium oxide. The expanded perlite and the magnesium oxide are premixed and the wet ingredients added and mixed. It will be understood that some of the water in the mix may come from water of hydration of the magnesium chloride. The resulting core mixture includes magnesium oxychloride as the reaction product between magnesium oxide and magnesium chloride, and has a pot in the range of about ½ to 4 hours, depending on its temperature, with the setting time being decreased as the temperature of the mix is increased. Forming and pressing of the board proceeds as described in connection with the standard board, typically to a thickness of ⅝ inch, with standard gypsum face and back papers being applied. Paper bonding of the face and back sheets to the core is achieved with a modified magnesium oxychloride cement adhesive produced according to the following formulation, by weight:

51.8% water
20.6% magnesium chloride (anhydrous basis)
0.3% hydroxyethyl cellulose water soluble thickener
27.3% reactive magnesium oxide This adhesive is produced by mixing the water, the hydroxyethyl cellulose thickening agent and magnesium chloride and allowing the latter ingredients to dissolve and thicken. This solution is then mixed with the magnesium oxide, yielding a paintable adhesive with a pot life of 1 to 4 hours, depending on temperature. The adhesive is viscous enough to provide good initial tack and is compatible with the core binder.

In connection with flame spread tests conducted in accordance with the ASTM E-84 tunnel test, it was found that the magnesium oxychloride binder in the core was effective in controlling burning of the combustible face paper. A flame spread index of 15 was obtained, easily meeting the ASTM C36 specification of 25 maximum.

As to fire resistance tests conducted on the improved fire resistant board of the invention, it was found that it maintains its integrity and shows no noticeable shrinkage throughout the test. The joints do not open and thus the wall cavity is not exposed to the fire. It was also determined that the reflectivity of radiant heat is high. Early in the fire test the paper facer burns off the surface of the board exposed directly to the fire, thereby exposing the core of the board to the flames. With gypsum board, the surface of the core quickly decomposes to become anhydrous calcium sulfate, resulting in shrinkage and cracking. With the perlite board, the perlite core decomposes to a surface of magnesium oxide-coated expanded perlite, with no noticeable shrinkage. The magnesium oxide reflects significantly more of the heat radiated by the hot combustion gases than does the calcium sulfate, thus allowing less heat to pass to the back surface of the board.

If desired, a polished aluminum foil may be laminated to the back face of the board upon the pressed board exiting from the drier, using sodium silicate as an adhesive. This adds to the effectiveness of the greater insulating value of the perlite core by interfering with radiant heat transfer across the wall cavity. Perforating the foil backing has no effect on the fire resistance improvement, and can be done when a vapor barrier is not desired.

Although no specific example has been given for the use of magnesium oxysulfate instead of magnesium oxychloride, it will be understood that similar procedures and formulations would be employed when using this ingredient, with the magnesium chloride being replaced by magnesium sulfate.

It may also be desired to modify the lightweight wallboard of the invention to make it water repellent. In connection with the previous mention of the use of a setting agent to provide moisture resistance, it will be understood that that is to prevent loss of strength due to the presence of moisture. To make the board water repellent, however, is to make it essentially moisture proof, as would be necessary for wallboard used in bath and shower areas as a base for plastic or ceramic tile. The surface water repellency of the board is provided by use of special facing papers which are treated with a wax emulsion to increase water repellency. Such papers are commercially available, as for example, from Sweetwater Paperboard Company of Austell, Ga. It was found that a polyvinyl acetate emulsion as an adhesive to bond the paper to the core provided the desired level of water repellency and good bonding strength. Although this adhesive worked well, it is recognized that further testing may reveal other adhesives which also work satisfactorily. Polyvinyl acetate emulsion, however, is the preferred paper bonding adhesive.

The core of water repellent lightweight wallboard is formed from a mixture containing the ingredients listed in Table 4 at the indicated weight percentage levels, based upon the total weight of the mixture.

TABLE 4

| Ingredient | Ingredients, wt. % General | Preferred |
|---|---|---|
| Expanded siliceous inorganic aggregate | 40-65 | 50-60 |
| Inorganic binder (dry weight) | 5-20 | 7-15 |
| Silicone emulsion (60% solids) | 0.05-1.0 | 0.1-0.2 |

TABLE 4-continued

| Ingredient | Ingredients, wt. % General | Preferred |
|---|---|---|
| Water | 10–60 | 20–30 |

Note that the ranges of particles, binder and water are similar to those of the standard formula due to the presence of silicone in such small amounts. The silicone provides lubrication and water repellency in the core. It is mixed with the water, then with the binder, and the wet premix is then mixed with the dry ingredients. The paper facers are then bonded to the core with the polyvinyl acetate adhesive and the board is produced in the same manner as described in connection with the standard product of the invention.

A preferred binder for use in the core is sodium silicate, with a setting agent being used to enhance moisture resistance as described earlier. A typical formulation for the moisture resistant board is as follows:

EXAMPLE V 58.2% expanded perlite, density 2.3 pcf, average diameter 150–200 microns
2.9% reactive magnesium oxide
12.9% silicate, Type N from PQ Corp. (solids basis)
25.7% water (including water from sodium silicate)
0.2% silicone emulsion (60% solids content)

The board was produced in the same manner described above. Note that on a solids basis, the 60% emulsion of silicone provides for silicone to be present in the mixture in the general range of 0.03% to 0.6% and in the preferred range of 0.06% to 0.12%.

It will be understood that although the ranges of ingredients of the fire resistant formula are specifically different from the ranges of ingredients of the standard and water repellent formulas, there is nonetheless substantial overlap between them. For example, a majority of the general range of 35% to 50% of inorganic particles in the fire resistant mixture falls within the general range of 40% to 65% of the standard mix, and the general ranges of water are similar except for the lower figure of the ranges. Even though the binder ranges differ, even these overlap to an extent.

It should now be appreciated that the invention provides for a process of manufacturing a lightweight wallboard which possesses the many benefits over gypsum board discussed above. Further, the process is economical and is not limited by the setting time required in gypsum board manufacture.

It will also be apparent that the invention is not necessarily limited to all the specific features described in connection with the preferred embodiments, but that changes to certain features which do not alter the overall function and concept of the invention may be made without departing from the spirit and scope of the invention, as defined in the claims.

What is claimed is:

1. A process for manufacturing a lightweight building material board comprised of a core and facing sheets, comprising the steps of:
   forming a mixture comprising the following ingredients, by weight of the mixture;
      about 40% to 65% expanded siliceous inorganic particles having a density in the approximate range of 1.5 pcf to 4 pcf and being of a size in the approximate range of 100 to 1000 microns;
      about 5% to 20% inorganic binder;
      about 10% to 60% water; and
      about 0% to 10% binder setting agent;
   depositing a layer of the mixture on a moving lower web of facing sheet material, the amount of water in the mixture being such that the consistency of the mixture is that of slightly damp powder;
   contacting the side of the layer opposite the lower web with an upper moving web of facing sheet material to form a sandwich of the webs and the mixture, both webs being sufficiently porous to permit the passage of moisture therethrough and both webs moving in the same direction;
   continuously applying pressure in the range of 30 psi to 500 psi to the moving sandwich by means of press rolls to compact the expanded inorganic particles, a substantial number of the particles being broken by the pressure and a substantial number of the particles remaining intact; and
   heating the compacted mixture in the range of 150° F. to 400° F. for a period of 0.25 to 6.0 hours to drive off water from the mixture through the facing sheet material and set the inorganic binder to form a core, whereby a board comprising the facing sheets and the core is formed;
   the degree of compaction and heating being such that the dry density of the core is in the range of 10 pcf to 30 pcf.

2. The process of claim 1, wherein the moving webs of facing sheet material are pulled from rolls of the material.

3. The process of claim 1, wherein the expanded siliceous inorganic particles comprise expanded perlite particles.

4. The process of claim 3, wherein the inorganic binder comprises sodium silicate.

5. The process of claim 4, wherein the expanded perlite particles are present in the mixture in the range of 50% to 60%, the sodium silicate is present in the range of 7% to 15% and water is present in the range of 20% to 30%.

6. The process of claim 1, including a minor amount of silicone in the mixture for the purpose of making the board water repellent.

7. The process of claim 6, wherein silicone is included in the mixture in amount, by weight, of 0.03% to 0.6%.

8. The process of claim 7, wherein silicone is included in the mixture in the amount, by weight, of 0.06% to 0.12%.

9. The process of claim 1, wherein the facing sheets are comprised of organic fibers.

10. The process of claim 1, wherein the side of the facing sheets which contact the mixture are coated with adhesive prior to contacting the mixture to strengthen the bond between the facing sheets and the core of the board.

11. The process of claim 1, including the step of cutting the sandwich to form individual boards.

12. The process of claim 1, wherein the inorganic binder is a heat absorbing binder selected from the group consisting essentially of magnesium oxychloride and magnesium oxysulfate.

13. The process of claim 12, wherein the expanded siliceous inorganic particles expanded perlite particles present in the mixture in the range of 40% to 45%, the heat-absorbing inorganic binder is present in the range of 20% to 25% and water is present in the range of 20% to 40%.

14. The process of claim 12, wherein the binder is magnesium oxychloride formed as the reaction product of magnesium oxide and magnesium chloride.

15. The process of claim 12, wherein the binder is magnesium oxysulfate formed as the reaction product of magnesium oxide and magnesium sulfate.

* * * * *